United States Patent
Kiefer et al.

(10) Patent No.: US 9,266,451 B2
(45) Date of Patent: *Feb. 23, 2016

(54) ALERT SYSTEMS AND METHODS FOR A VEHICLE

(71) Applicant: GM GLOBAL TECHNOLOGY OPERATIONS LLC, Detroit, MI (US)

(72) Inventors: Raymond J. Kiefer, Huntington Woods, MI (US); Diane K. McQueen, Leonard, MI (US); Mark A. Stebbins, Bloomfield Hills, MI (US); Charles A. Green, Canton, MI (US); Alexander N. Ballios, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/894,347

(22) Filed: May 14, 2013

(65) Prior Publication Data

US 2013/0341977 A1 Dec. 26, 2013

Related U.S. Application Data

(60) Provisional application No. 61/663,516, filed on Jun. 22, 2012.

(51) Int. Cl.
*G08B 6/00* (2006.01)
*B60N 2/44* (2006.01)

(52) U.S. Cl.
CPC ............. *B60N 2/448* (2013.01); *B60N 2/449* (2013.01); *B60N 2002/4485* (2013.01); *G08B 6/00* (2013.01)

(58) Field of Classification Search
CPC ............. G08B 23/00; G08B 6/00; H04B 3/36
USPC ...................... 340/407.1, 575, 576, 903, 435; 297/217.1, 217.3
See application file for complete search history.

(56) References Cited

U.S. PATENT DOCUMENTS

| 5,432,509 A | 7/1995 | Kajiwara |
| 5,890,083 A | 3/1999 | Franke et al. |

(Continued)

FOREIGN PATENT DOCUMENTS

| CN | 101342874 A | 1/2009 |
| CN | 101391146 A | 3/2009 |

(Continued)

OTHER PUBLICATIONS

U.S. Appl. No. 13/894,279, dated May 14, 2013.

(Continued)

*Primary Examiner* — Brent Swarthout
(74) *Attorney, Agent, or Firm* — Ingrassia Fisher & Lorenz, P.C.

(57) ABSTRACT

Haptic feedback systems, vehicle seat assemblies, and vehicles are provided. The haptic feedback system includes a bottom seat member, a first motor, and a second motor. The bottom seat member includes a seat pan with a first side, a second side, a first bolster, and a second bolster. The first bolster is positioned on the first side of the seat pan and the second bolster is positioned on the second side of the seat pan, wherein the first bolster and the second bolster include a resilient material. The first motor supported by the resilient material of the first bolster and the second motor is supported by the resilient material of the second bolster.

13 Claims, 8 Drawing Sheets

(56) References Cited

U.S. PATENT DOCUMENTS

| | | | |
|---|---|---|---|
| 6,127,944 | A | 10/2000 | Daly et al. |
| 6,289,332 | B2 | 9/2001 | Menig et al. |
| 6,345,179 | B1 | 2/2002 | Weigers et al. |
| 6,744,370 | B1 | 6/2004 | Sleichter, III et al. |
| 6,834,232 | B1 | 12/2004 | Malhotra |
| 7,095,315 | B2 | 8/2006 | Lemke |
| 7,170,400 | B2 | 1/2007 | Cowelchuk et al. |
| 7,245,231 | B2 | 7/2007 | Kiefer et al. |
| 7,369,042 | B2 | 5/2008 | Osaka et al. |
| 7,391,305 | B2 | 6/2008 | Knoll et al. |
| 7,515,066 | B2 | 4/2009 | Watanabe |
| 7,619,505 | B2 * | 11/2009 | Kim ........................... 340/407.1 |
| 8,013,720 | B2 | 9/2011 | Oelrich et al. |
| 8,305,200 | B2 | 11/2012 | Murphy et al. |
| 8,339,285 | B2 * | 12/2012 | Boren et al. ................. 340/965 |
| 8,593,301 | B2 | 11/2013 | Newman |
| 8,669,857 | B2 | 3/2014 | Sun et al. |
| 2003/0128182 | A1 | 7/2003 | Donath et al. |
| 2003/0229447 | A1 | 12/2003 | Wheatley et al. |
| 2003/0231163 | A1 | 12/2003 | Hanon et al. |
| 2004/0049232 | A1 | 3/2004 | Ideker et al. |
| 2004/0049323 | A1 * | 3/2004 | Tijerina et al. ..................... 701/1 |
| 2004/0252027 | A1 | 12/2004 | Torkkola et al. |
| 2005/0043864 | A1 | 2/2005 | Echtenkamp |
| 2005/0125153 | A1 | 6/2005 | Matsumoto et al. |
| 2006/0255920 | A1 | 11/2006 | Maeda et al. |
| 2007/0001830 | A1 | 1/2007 | Dagci et al. |
| 2007/0109104 | A1 | 5/2007 | Altan et al. |
| 2008/0042813 | A1 | 2/2008 | Wheatley et al. |
| 2008/0085686 | A1 | 4/2008 | Kalik |
| 2008/0174415 | A1 | 7/2008 | Tanida et al. |
| 2008/0197901 | A1 | 8/2008 | Cruz-Hernandez et al. |
| 2008/0201039 | A1 | 8/2008 | Matsuoka et al. |
| 2009/0015045 | A1 * | 1/2009 | Nathan et al. .............. 297/217.3 |
| 2009/0079690 | A1 | 3/2009 | Watson et al. |
| 2009/0232320 | A1 | 9/2009 | Azizi et al. |
| 2010/0114467 | A1 | 5/2010 | Samuel et al. |
| 2010/0201508 | A1 | 8/2010 | Green et al. |
| 2010/0274438 | A1 * | 10/2010 | Egami ............................. 701/29 |
| 2010/0295707 | A1 | 11/2010 | Bennie et al. |
| 2011/0001616 | A1 | 1/2011 | Nathan et al. |
| 2011/0066325 | A1 | 3/2011 | Lu et al. |
| 2011/0169626 | A1 | 7/2011 | Sun et al. |
| 2011/0187518 | A1 | 8/2011 | Strumolo et al. |
| 2011/0316686 | A1 * | 12/2011 | Matsuno et al. .............. 340/435 |
| 2012/0081234 | A1 | 4/2012 | Shaffer et al. |
| 2012/0154156 | A1 | 6/2012 | Kuntzel |
| 2012/0212353 | A1 | 8/2012 | Fung et al. |
| 2012/0269358 | A1 | 10/2012 | Gee et al. |
| 2012/0283939 | A1 | 11/2012 | Bobbitt, III |
| 2013/0009789 | A1 | 1/2013 | Ichikawa |
| 2013/0325313 | A1 | 12/2013 | Kim et al. |

FOREIGN PATENT DOCUMENTS

| | | |
|---|---|---|
| CN | 101678819 A | 3/2010 |
| CN | 101728942 A | 6/2010 |
| CN | 101968910 A | 2/2011 |
| CN | 101973210 A | 2/2011 |
| CN | 201749540 U | 2/2011 |
| CN | 201932077 U | 8/2011 |
| CN | 202071799 U | 12/2011 |
| GB | 2414304 A | 11/2005 |
| JP | 2012006518 A | 1/2012 |
| WO | 2009134525 A1 | 11/2009 |
| WO | 2011062869 A1 | 5/2011 |

OTHER PUBLICATIONS

U.S. Appl. No. 13/894,283, dated May 14, 2013.
U.S. Appl. No. 13/894,317, dated May 14, 2013.
U.S. Appl. No. 13/894,322, dated May 14, 2013.
U.S. Appl. No. 13/894,290, dated May 14, 2013.
U.S. Appl. No. 13/894,345, dated May 14, 2013.
U.S. Appl. No. 13/894,294, dated May 14, 2013.
U.S. Appl. No. 13/894,297, dated May 14, 2013.
U.S. Appl. No. 13/894,302, dated May 14, 2013.
U.S. Appl. No. 13/894,307, dated May 14, 2013.
U.S. Appl. No. 13/894,308, dated May 14, 2013.
USPTO, Office Action for U.S. Appl. No. 13/894,347, mailed Oct. 21, 2014.
USPTO, Office Action for U.S. Appl. No. 13/894,308, mailed Dec. 3, 2014.
USPTO, Office Action for U.S. Appl. No. 13/894,290, mailed Nov. 24, 2014.
USPTO, Notice of Allowance for U.S. Appl. No. 13/894,297, mailed Oct. 7, 2014.
USPTO, Office Action for U.S. Appl. No. 13/894,317 mailed Dec. 10, 2014.
USPTO, Office Action for U.S. Appl. No. 13/894,302 mailed Dec. 10, 2014.
USPTO, Office Action for U.S. Appl. No. 13/894,294, mailed Jan. 2, 2015.
USPTO, Office Action for U.S. Appl. No. 13/894,307 mailed Apr. 17, 2015.
USPTO, Notice of Allowance and Fee(s) Due for U.S. Appl. No. 13/894,294 mailed May 11, 2015.
State Intellectual Property Office of the People'S Republic of China, Office Action in Chinese Patent Application No. 201310343668.1 mailed Apr. 8, 2015.
USPTO, Office Action for U.S. Appl. No. 13/894,322 mailed Feb. 3, 2015.
USPTO, Final Office Action for U.S. Appl. No. 13/894,308 mailed Mar. 17, 2015.
USPTO, Final Office Action for U.S. Appl. No. 13/894,302 mailed Mar. 18, 2015.
USPTO, Final Office Action for U.S. Appl. No. 13/894,290 mailed Mar. 25, 2015.
USPTO, Notice of Allowance and Fee(s) Due for U.S. Appl. No. 13/894,317 mailed Apr. 1, 2015.
State Intellectual Property Office of the People'S Republic of China, Office Action in Chinese Patent Application No. 201310498497.X mailed Apr. 13, 2015.
State Intellectual Property Office of the People'S Republic of China, Office Action in Chinese Patent Application No. 201310248857.0 mailed May 6, 2015.
State Intellectual Property Office of the People'S Republic of China, Office Action in Chinese Patent Application No. 201310249780.9 mailed Jun. 3, 2015.
State Intellectual Property Office of the People'S Republic of China, Office Action in Chinese Patent Application No. 201310249842.6 mailed Jun. 18, 2015.
USPTO, Office Action for U.S. Appl. No. 13/894,345 mailed Jun. 29, 2015.
State Intellectual Property Office of the People'S Republic of China, Office Action in Chinese Patent Application No. 201310249799.3 mailed Sep. 14, 2015.
USPTO, Office Action in U.S. Appl. No. 13/894,308 mailed Oct. 6, 2015.
USPTO, Office Action in U.S. Appl. No. 13/894,290 mailed Oct. 7, 2015.
USPTO, Office Action in U.S. Appl. No. 13/894,302 mailed Oct. 7, 2015.
USPTO, Final Office Action in U.S. Appl. No. 13/894,345 mailed Oct. 8, 2015.

* cited by examiner

ALERT SYSTEMS AND METHODS FOR A VEHICLE

CROSS REFERENCE TO RELATED APPLICATIONS

This application claims the benefit of U.S. Provisional Application No. 61/663,516 filed Jun. 22, 2012 and hereby incorporated by reference.

TECHNICAL FIELD

The technical field generally relates to driver alert systems and methods, and more particularly relates to driver alert systems and methods that include haptic devices associated with a vehicle seat assembly.

BACKGROUND

Collision avoidance systems warn drivers of potential collision threats that may be in the line-of-sight of the driver (e.g., detected by on-board vehicle sensors) or out of the line-of-sight of the driver (e.g., determined from wireless vehicle-to-vehicle communications and/or vehicle-to-infrastructure communications). Collision avoidance systems may generate visual and/or auditory alerts to warn a vehicle driver of the potential collision threats. However, vehicle designers continue to develop more effective mechanisms for alerting the driver to a condition that needs attention, particularly haptic alert assemblies.

Accordingly, it is desirable to provide methods and systems for alerting a driver of the vehicle using a haptic device, particularly improved methods and systems that generate more effective haptic alerts. Other desirable features and characteristics of the present invention will become apparent from the subsequent detailed description and the appended claims, taken in conjunction with the accompanying drawings and the foregoing technical field and background.

SUMMARY

A haptic feedback system is provided for alerting a seat occupant. In one embodiment, the haptic feedback system includes a bottom seat member, a first motor, and a second motor. The bottom seat member includes a seat pan with a first side, a second side, a first bolster, and a second bolster. The first bolster is positioned on the first side of the seat pan and the second bolster is positioned on the second side of the seat pan. The first bolster and the second bolster include a resilient material. The first motor supported by the resilient material of the first bolster and the second motor is supported by the resilient material of the second bolster.

A vehicle seat assembly is provided for alerting a seat occupant. In one embodiment, the vehicle seat assembly includes a seat frame, a bottom seat member, a first motor, and a second motor. The bottom seat member is secured to the seat frame and includes a seat pan with a first side and a second side, a first bolster positioned on the first side of the seat pan, and a second bolster positioned on the second side of the seat pan. The first bolster and the second bolster include a resilient material. The first motor is supported by and separated from the seat frame by the resilient material of the first bolster to attenuate vibrations between the first motor and the seat frame. The second motor is supported by and separated from the seat frame by the resilient material of the second bolster to attenuate vibrations between the second motor and the seat frame.

A vehicle is provided for providing haptic alerts to occupants. In one embodiment, the vehicle includes a seat frame, a bottom seat member, a first motor, a second motor, and a controller. The bottom seat member is secured to the seat frame and includes a seat pan with a first side and a second side, a first bolster positioned on the first side of the seat pan, and a second bolster positioned on the second side of the seat pan. The first bolster and the second bolster include a resilient material. The first motor is supported by and separated from the seat frame by the resilient material of the first bolster to attenuate vibrations between the first motor and the seat frame. The second motor is supported by and separated from the seat frame by the resilient material of the second bolster to attenuate vibrations between the second motor and the seat frame. The controller is in communication with the first motor and the second motor and generates a first pulse width modulation (PWM) signal to command the first motor based on a vibrational coupling between the first motor and the second bolster. The controller generates a second PWM signal to command the second motor based on a vibrational coupling between the second motor and the first bolster.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
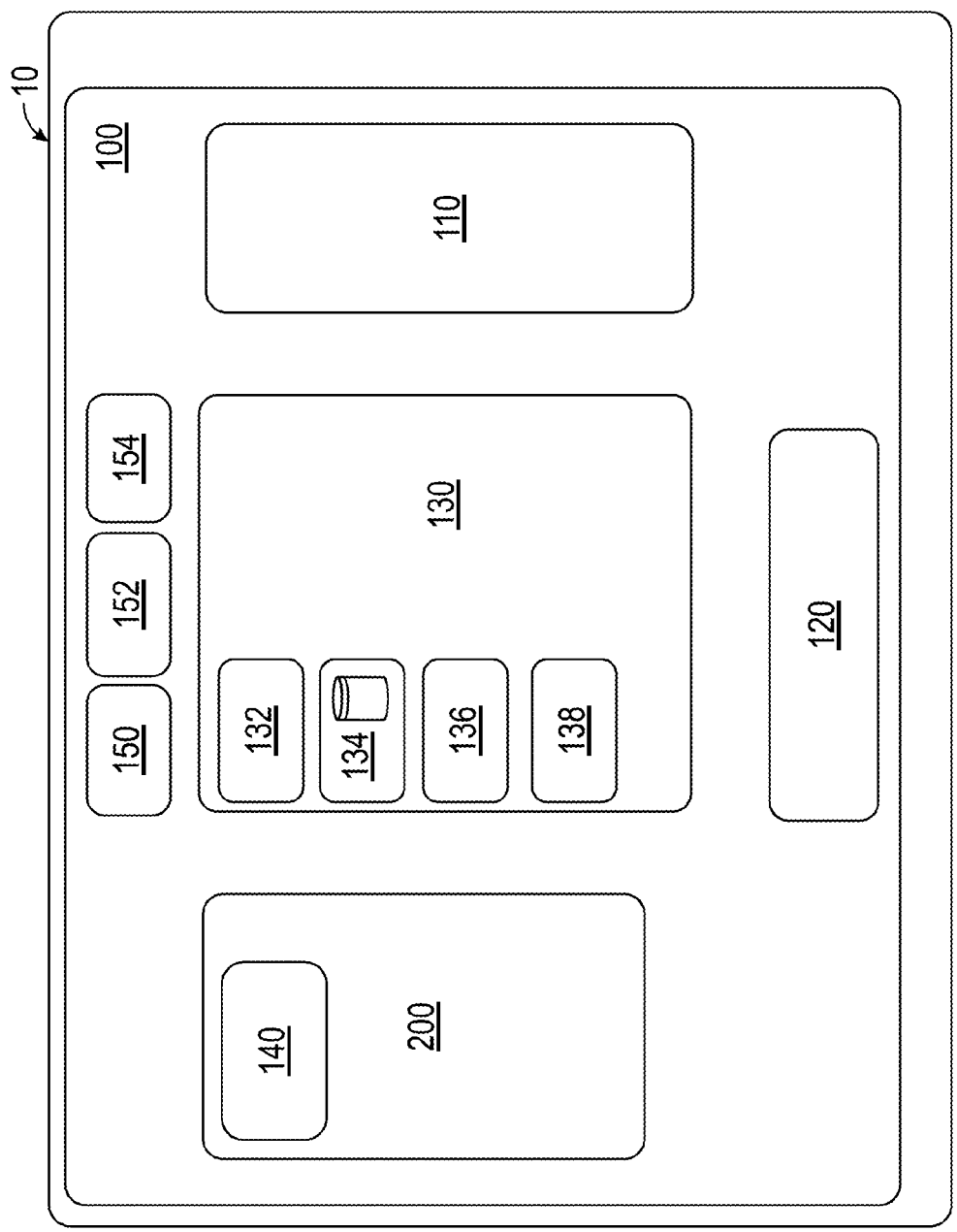
FIG. 1 is a functional block diagram illustrating a vehicle that includes a driver alert system in accordance with exemplary embodiments.

The following detailed description is merely exemplary in nature and is not intended to limit the application and uses.

Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Broadly, exemplary embodiments discussed herein refer to driver alert systems and methods implemented as a vehicle seat assembly. The driver alert systems and methods may include actuators incorporated into seat bolsters that provide improved haptic responses and more efficient installation.

FIG. 1 is a functional block diagram illustrating a vehicle 10 that includes a driver alert system 100 in accordance with exemplary embodiments. Although not shown, the vehicle has a generally known configuration with one or more seats for supporting a driver and passenger(s). In some embodiments, the vehicle has other seating styles, such as free standing, bench seats, etc. Additional details about a vehicle seat assembly 200 will be provided below after a brief description of the driver alert system 100.

In general, the driver alert system includes one or more collision avoidance modules 110, a communications module 120, a control module 130, a haptic alert assembly (or haptic feedback assembly) 140, and one or more additional alert devices, including a visual alert device 150, an auditory alert device 152, and an infotainment alert device 154. As introduced above and as described in greater detail below, the haptic alert assembly 140 may be incorporated into the vehicle seat assembly 200, which may also be considered part of the driver alert system 100. During operation and as also discussed in greater detail below, the control module 130 receives input signals from the collision avoidance modules 110 and communications module 120 that indicate the possibility of a collision condition. The control module 130 evaluates the input signals, and as appropriate, operates the haptic alert assembly 140 and/or alert devices 150, 152, 154 to alert the driver of the collision condition. As such, the driver alert system 100 may function to alert the driver of a collision condition such that avoidance maneuvers (e.g., braking and/or steering) and/or automatic crash mitigation responses (e.g., braking and/or steering) may be initiated. Although the figures shown herein depict example arrangements of elements, additional intervening elements, devices, features, or components may be present in an actual embodiment.

In general, the collision avoidance modules 110 include one or more on-board vehicle sensors (e.g., camera, radar, and/or lidar) that detect a potential for a collision based on the vehicle sensor signals. The collision avoidance modules 110 may generally be implemented as, for example, forward collision warning systems, lane departure warning systems, lane keeping assist systems, front park assist systems, rear park assist systems, front automatic braking systems, rear automatic braking systems, rear cross traffic alert systems, adaptive cruise control (ACC) systems, side blind spot detection systems, lane change alert systems, driver attention systems, front pedestrian detection systems, and rear pedestrian detection systems. As noted above, the driver alert system 100 may further include communications module 120 to enable communications between vehicles and/or between the vehicle and an infrastructure to forecast potential collision due to traffic or activity either inside the line-of-sight of the driver or outside of the line-of-sight of the driver (e.g., a road hazard or traffic jam ahead is detected beyond the driver's line-of-sight). In general, the collision avoidance modules 110 and/or communications module 120 are communicatively coupled to a control module 130 that evaluates a potential for a collision based on the vehicle sensor signals and/or communications.

The control module 130 includes one or more submodule or units 132, 134, 136, and 138 that cooperate to evaluate the signals from the collision avoidance modules 110 and communications module 120, and in response, generate a control signal for operating one or more of the haptic alert assembly 140 and/or the devices 150, 152, 154. As described below, the control module 130 may include a monitoring unit 132, a user configuration unit 134, an evaluation unit 136, and a pattern determination unit 138. As can be appreciated, the units shown in FIG. 1 may be combined and/or further partitioned to similarly coordinate and provide driver alerts.

In general, the monitoring unit 132 monitors input from various components of the vehicle 10, particularly the haptic alert assembly 140 to determine proper operation. If the monitoring unit 132 determines that a component is malfunctioning, the monitoring unit 132 may generate a warning message, a warning signal, and/or a faulty condition status that may be communicated to the vehicle driver or technician.

The user configuration unit 134 manages the display of a configuration menu and manages user input received from a user interacting with the configuration menu. Such a configuration menu may be displayed on a display device within the vehicle or remote from the vehicle. In various embodiments, the configuration menu includes selectable options that, when selected, allow a user to configure the various alert settings associated with the devices 150, 152, 154 and/or haptic alert assembly 140. The alert settings for the haptic alert device 140 can include, but are not limited to, an occurrence of the vibration (e.g., whether or not to perform the vibration for a particular mode), a location of the vibration on the seat, an intensity of the vibration, a duration of the vibration, a rate of the vibration, and/or a frequency of the pulses of the vibration. Based on the user input received from the user interacting with the configuration menu, the user configuration unit 134 stores the user configured alert settings in an alert settings database. As can be appreciated, the alert settings database may include volatile memory that temporarily stores the settings, non-volatile memory that stores the settings across key cycles, or a combination of volatile and non-volatile memory.

The evaluation unit 136 functions to ascertain the current mode of the vehicle 10 and to evaluate, based on that mode, the condition input signals and communications from the collision avoidance modules 110 and communications module 120. Based on this evaluation, the evaluation unit 136 may determine that a collision condition exists, e.g., that the vehicle may have the potential to be imminently in a collision. Upon declaring a collision condition, the evaluation unit 136 sends an appropriate signal to the pattern determination unit 138. The signal may also indicate the nature of the collision condition.

Upon indication of the collision condition, the pattern determination unit 138 generates a control signal to operate one or more of the devices 150, 152, 154 and/or haptic alert assembly 140. In one exemplary embodiment, the control signal may define one or more alert patterns based on the collision condition. The alert patterns include haptic alert patterns, visual alert patterns, and/or auditory alert patterns. In various embodiments, the pattern determination unit 138 determines the alert patterns by retrieving the predefined alert settings and/or the user defined alert settings from the alert setting database based on the collision condition. Additional details about the alert patterns are discussed below.

The alert pattern may also indicate a synchronization of multiple aspects of the devices 150, 152, 154 and haptic alert assembly 140. For example, and as discussed below, the haptic alert assembly 140 may include multiple actuators, such as right and left actuators. As such, the alert pattern may include directional commands, such as the operation of the right and/or left actuator to provide additional information about the nature of the collision condition (e.g., operation of only the right actuator would indicate collision threat is on the right).

Any suitable visual alert device 150 and auditory alert device 152 may be provided. As example, the visual alert device 150 may be implemented as a light within the interior of the vehicle 10 and the auditory alert device 152 may be implemented as part of the vehicle stereo system. The infotainment alert device 154 may correspond to a device or combination of devices for interacting with the vehicle 10. For example, the infotainment alert device 154 may include a display screen integrated the dashboard and user interfaces, such as a touch screen, buttons, and/or rotary dials. The alert signals associated with the infotainment alert device 154 may take the form of visual, audible, and/or haptic alert.

The haptic alert assembly 140 may be any suitable haptic alert device. In one exemplary embodiment, the haptic alert assembly 140 is implemented as part of the vehicle seat assembly 200, as will now be described in greater detail.

Figure 2:
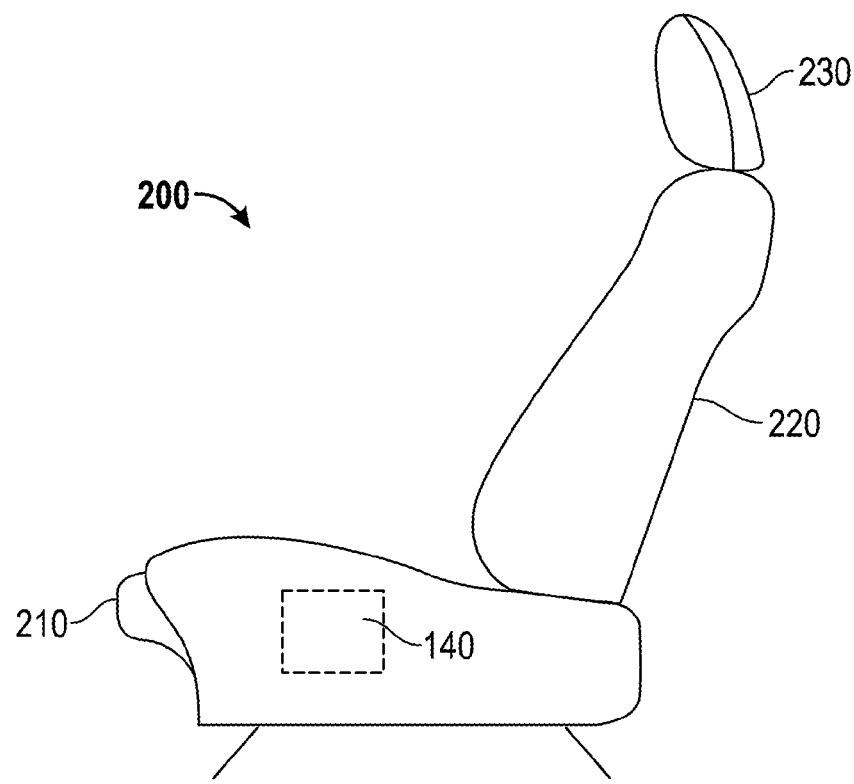
FIG. 2 is a schematic side positional view of a vehicle seat assembly of the vehicle of FIG. 1 in accordance with an exemplary embodiment.

FIG. 2 is a schematic side view of a vehicle seat assembly 200 in accordance with an exemplary embodiment. The seat assembly 200 may be installed on a floor of the passenger area of a vehicle, such as the vehicle 10 described above. In one exemplary embodiment, the seat assembly 200 is a driver seat for an automobile, although in other exemplary embodiments, the seat assembly 200 may be a passenger seat and/or implemented into any type of vehicle.

As shown in FIG. 2, the seat assembly 200 includes a lower seat member 210, a seat back member 220, a head rest 230, and a haptic alert assembly 140, such as the haptic alert assembly 140 introduced above in the discussion of FIG. 1. The lower seat member 210 defines a generally horizontal surface for supporting an occupant (not shown). The seat back member 220 may be pivotally coupled to the lower seat member 210 and defines a generally vertical surface for supporting the back of an occupant. The head rest 230 is operatively coupled to the seat back member 220 to support the head of an occupant. Similar to FIG. 5 described below, the lower seat member 210, the seat back member 220, and the head rest 230 are each formed by a resilient material (e.g., a foam body) mounted on a frame and covered with a cover.

As described in greater detail below, the haptic alert assembly 140 is installed in the lower seat member 210 to provide haptic signals (e.g., vibrations) to the occupant in predetermined situations. As noted above, the haptic alert assembly 140 is part of the driver alert system 100 to alert the driver and/or automatically control (e.g., brake, or steer) the vehicle to either help the driver avoid the crash or reduce the crash impact speed.

Figure 3:
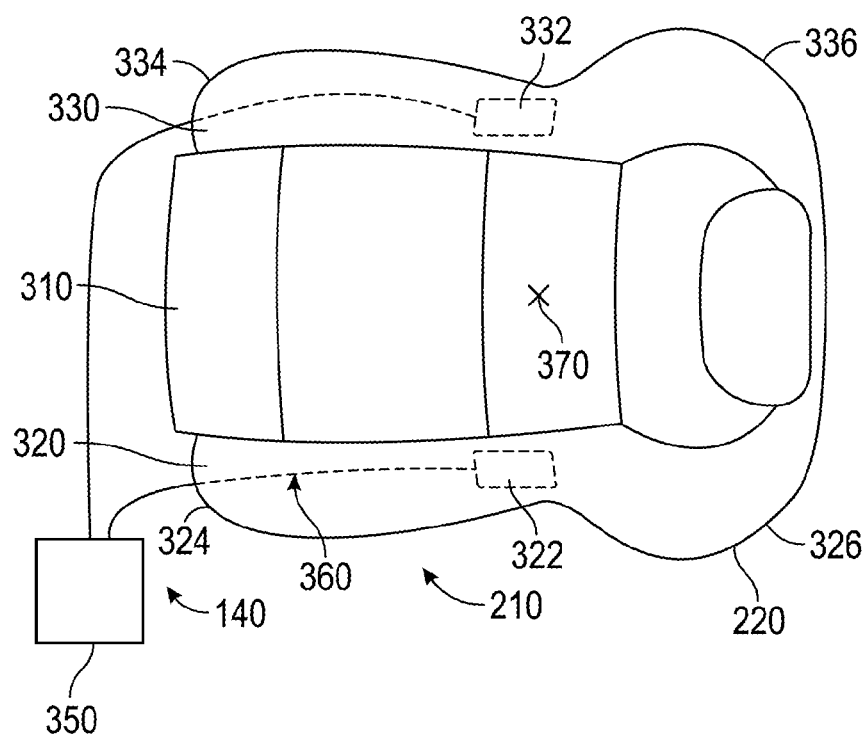
FIG. 3 is a partial top positional view of the seat assembly of FIG. 2 in accordance with an exemplary embodiment.

FIG. 3 is a top view of the seat assembly 200 of FIG. 2 in accordance with an exemplary embodiment. As shown in FIG. 3, the lower seat member 210 generally includes a seat pan 310, a first bolster 320, and a second bolster 330. The bolsters 320, 330 are generally considered the left outermost and right outermost side of the lower seat member 210, respectively. As can be appreciated, in various other embodiments, the seat pan 310 can be without bolsters 320, 330, such as a flat seat. In FIG. 3, the bolsters 320, 330 are arranged on the longitudinal sides of the seat pan 310 (e.g., the left and right sides) to support the legs and thighs of the occupants. Each of the bolsters 320, 330 may be considered to have a front end 324, 334 and a back end 326, 336 relative to the primary direction of travel. As shown, the seat back member 220 may overlap a portion of the bolsters 320, 330 at the back ends 326, 336. As is generally recognized in seat design, the bolsters 320, 330 are arranged on the sides of the lower seat member 210, typically at an angle to the seat pan 310.

FIG. 3 additionally illustrates positional aspects of the haptic alert assembly 140. In particular, the haptic alert assembly 140 includes a first actuator 322 installed in the first bolster 320 and a second actuator 332 installed in the second bolster 330. The first and second actuators 322, 332 are coupled to a haptic controller 350 with a wiring harness 360. In one exemplary embodiment, the haptic controller 350 corresponds to the control module 130 discussed above, although the haptic controller 350 may alternatively be a separate controller.

In general, the first and second actuators 322, 332 are positioned to enable the occupant to clearly and quickly perceive and differentiate various types of haptic signals without negatively impacting seat comfort and seat durability. The particular locations of the first and second actuators 322, 332 may additionally depend on seat design considerations, including seat structure, bolster design, and foam thickness. Although the first and second actuators 322, 332 are described as being positioned in the bolsters 320, 330, in other embodiments, the first and second actuators 322, 332 may be positioned in other areas of the seat assembly 200, such as the seat pan 310, seat back member 220, and/or the head rest 230.

As shown, first and second actuators 322, 332 (e.g., two actuators) are provided to independently generate the desired haptic signals to the occupant either on the left side, right side, or both the left and right sides. However, in other embodiments, additional actuators may be provided. In one exemplary embodiment, installation of the first and second actuators 322, 332 in the first and second bolsters 320, 330 functions to isolate the actuators' vibration 322, 332 from one another such that the actuators 322, 332 tactile vibration is decoupled (or isolated) from one another.

As such, the vibrations may be highly localized. Consequently, when it is desired to generate only of these two actuators (e.g., the left actuator), the seat occupant does not experience unintended vibrations that can travel through the seat cushion material or seat structure to the other actuator location (e.g., the right actuator). As one example, the peak amplitude of measured vertical acceleration at the activated actuator location normal to the seat bolster surface may be at least seven times greater than the peak amplitude of the measured acceleration along the axis parallel to the axis of rotation of the motor actuation.

In one exemplary embodiment, the first and second actuators 322, 332 are positioned about two-thirds of the distance between the front ends 324, 334 of the bolsters 320, 330 and the seat back member 220. In one exemplary embodiment, the first and second actuators 322, 332 (e.g., the forward edge of the actuators 322, 332) may be laterally aligned with the H-point (or hip-point) 370, as schematically shown. In other embodiments, the actuators 322, 332 (e.g., the rear edge of the actuators 322, 332) are positioned approximately 25 cm forward of the H-point 370 and/or between 0 cm and 25 cm forward of the H-point 370. As generally recognized in vehicle design, the H-point 370 is the theoretical, relative location of an occupant's hip, specifically the pivot point between the torso and upper leg portions of the body. In general and as discussed above, the actuators 322, 332 are positioned with consideration for performance, seat durability, and seat comfort. However, the exemplary positions discussed herein enable advantageous occupant reaction times from the perspectives of both recognition and interpretation (e.g., feeling the vibration and recognizing the alert direction), typically on the order of hundreds of milliseconds. In one exemplary embodiment, the location of the H-point 370 is unchanged as compared to a lower seat member without a haptic feedback assembly.

As described below, the two actuators 322, 332 provide advantages with respect to the occupant detection and interpretation of alert (e.g., the direction of the crash threat), seat comfort, and seat durability. In one exemplary embodiment, the actuators 322, 332 may individually generate first and second portions of a haptic alert, respectively, or be individually operated to generate the entire response. As an example, the two actuators 322, 332 provide a clear signal regarding the nature of the alert and direction the alert is referring to, e.g., rapid pulsing of the left actuator 322 signals to the driver indicate they have drifted across a left lane marking without their left turn signal activated. Additional actuators, such as also activating the right actuator in this case of a left lane departure, will reduce the chance the occupant will correctly associate the activation with a left side event and it will increase the time it takes for the occupant to determine a left side event has occurred (e.g., if the actuation occurs when the driver is looking away from the road ahead). Similarly, the position and size of the actuators 322, 332 provide advantages with respect to seat durability, which can be measured by commonly used sliding entry, jounce and squirm, and knee load durability seat validation tests. The actuators 322, 332 may be designed to function for 100,000 actuation sequences over 150,000 miles of vehicle life. Other actuator positions may compromise occupant detection and alert effectiveness, seat comfort, and seat durability. For example, if the haptic device is placed at the very front edge of the seat, the occupant may not perceive seat vibrations if they pull their legs back against the front portions of the seat.

As described above, the haptic controller 350 commands actuators 322, 332 based on a haptic pattern. For example, when an object is detected approaching from the right side of the vehicle when the occupant is backing a vehicle, the actuator 332 positioned near the driver's right leg is selected for actuation. Conversely, when an object is detected approaching from the left side of the vehicle when the occupant is backing a vehicle, the actuator 322 positioned near the driver's left leg is selected for actuation. The actuators 322, 332 are similarly selected for right and left lane departure warnings, or other potential hazards detected to the sides of the vehicle. When a potential hazard is detected to the front or rear of the vehicle, the haptic controller 350 selects actuators 322, 332 on both sides of the driver to actuate.

In one exemplary embodiment, the peak amplitude of measured vertical acceleration at the activated actuator location normal to the seat bolster surface may be at least five times greater than the peak amplitude of the measured acceleration in the vertical, fore-aft, and lateral directions at non-activated actuator locations. Moreover, by way of example, the actuation profile may be adjusted to create a desired acceleration profile felt by variously sized drivers. For example, a high frequency component of the vibration corresponding to the rotational speed of the motor 600 is preferably within the range of 55 to 67 Hz. The high frequency component is also selected to reduce undesirable interactions with road vibration frequencies (e.g., masking of the actuation vibration). The vertical acceleration of the vibration is preferably between 50 and 72 m/s$^2$, and this acceleration level is preferably within 10% across each of the actuator locations.

Figure 5:
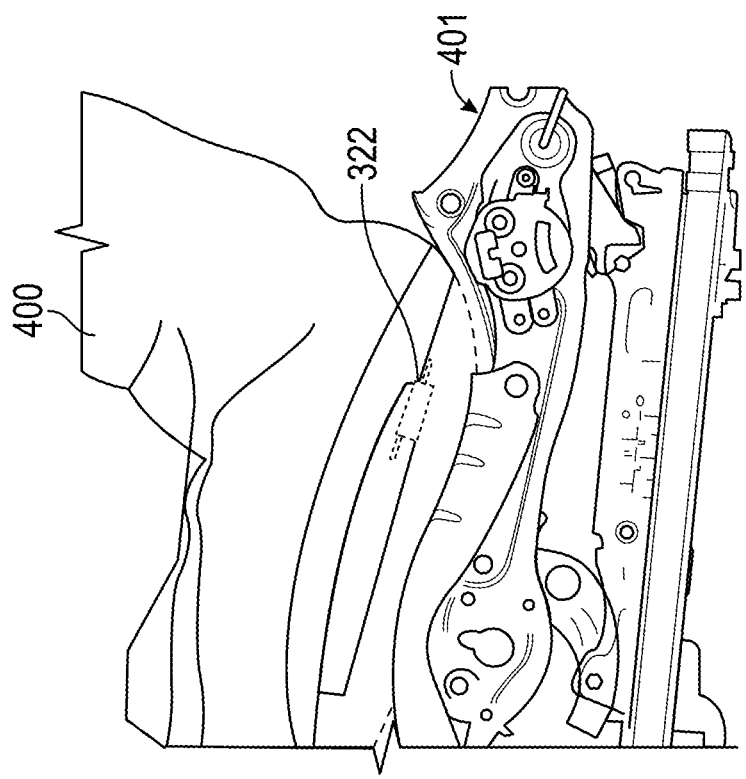
FIG. 5 is a schematic side positional view of haptic actuator devices incorporated into the seat assembly of FIG. 3 in accordance with an exemplary embodiment.
Figure 4:
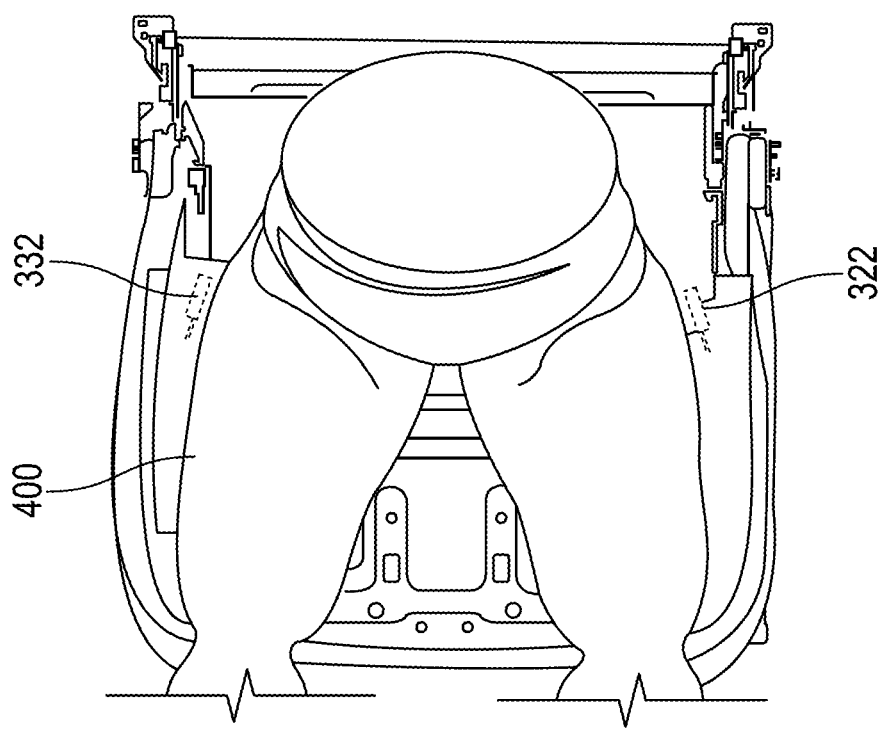
FIG. 4 is a schematic top positional view of haptic actuator devices incorporated into the seat assembly of FIG. 3 in accordance with an exemplary embodiment.

FIGS. 4 and 5 are respective top and side views of portions of the haptic alert assembly 140 relative to an exemplary occupant 400. As shown, the first and second actuators 322, 332 are positioned immediately proximate to each thigh of the occupant. In the depicted exemplary embodiment, the occupant 400 is a female with the size in the lowest fifth percentile. In other words, the depicted occupant 400 is relatively small with respect to an average occupant and larger occupants will generally have higher seat pressure distributions near the haptic seat devices and will generally make contact with a larger area of the seat.

FIGS. 4 and 5 further illustrate resilient material (e.g., a foam body in a bolster) secured to the seat frame 401. The actuators 322, 332 may include motors and as are supported by and separated from the seat frame 401 by the foam bodies of the bolsters to attenuate vibrations between the actuators and the seat frame 401. In some embodiments, the actuators 322, 332 are encompassed by the resilient material.

Figure 6A:
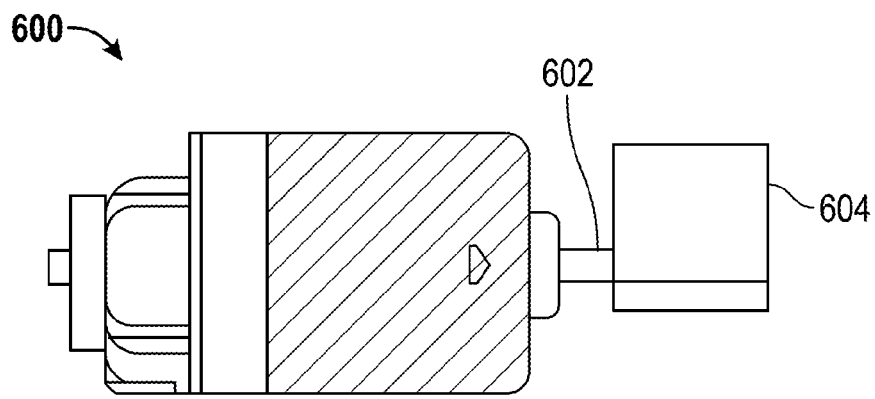
FIG. 6A is a side positional view of a motor incorporated into the seat assembly of FIG. 3 in accordance with an exemplary embodiment.

FIG. 6A is a side view of a motor 600 that may be incorporated into the actuators 322, 332 described above. As an example, one motor 600 may be incorporated into each actuator 322, 332. The motor 600 may be a relatively small and light motor, for example, a 12 VDC motor in which an electric current drives magnets or coils to rotate output shaft 602. An eccentric mass 604 is coupled to and rotates with the shaft 602 to produce a haptic response. In other words, the eccentric mass 604 is selectively rotated to produce a vibrating sensation for an occupant. The motor 600 and/or shaft 602 may be sized and shaped to produce the desired characteristics of the haptic response. Other types of motors and/or actuation assemblies may be provided, including smart materials.

Figure 6B:
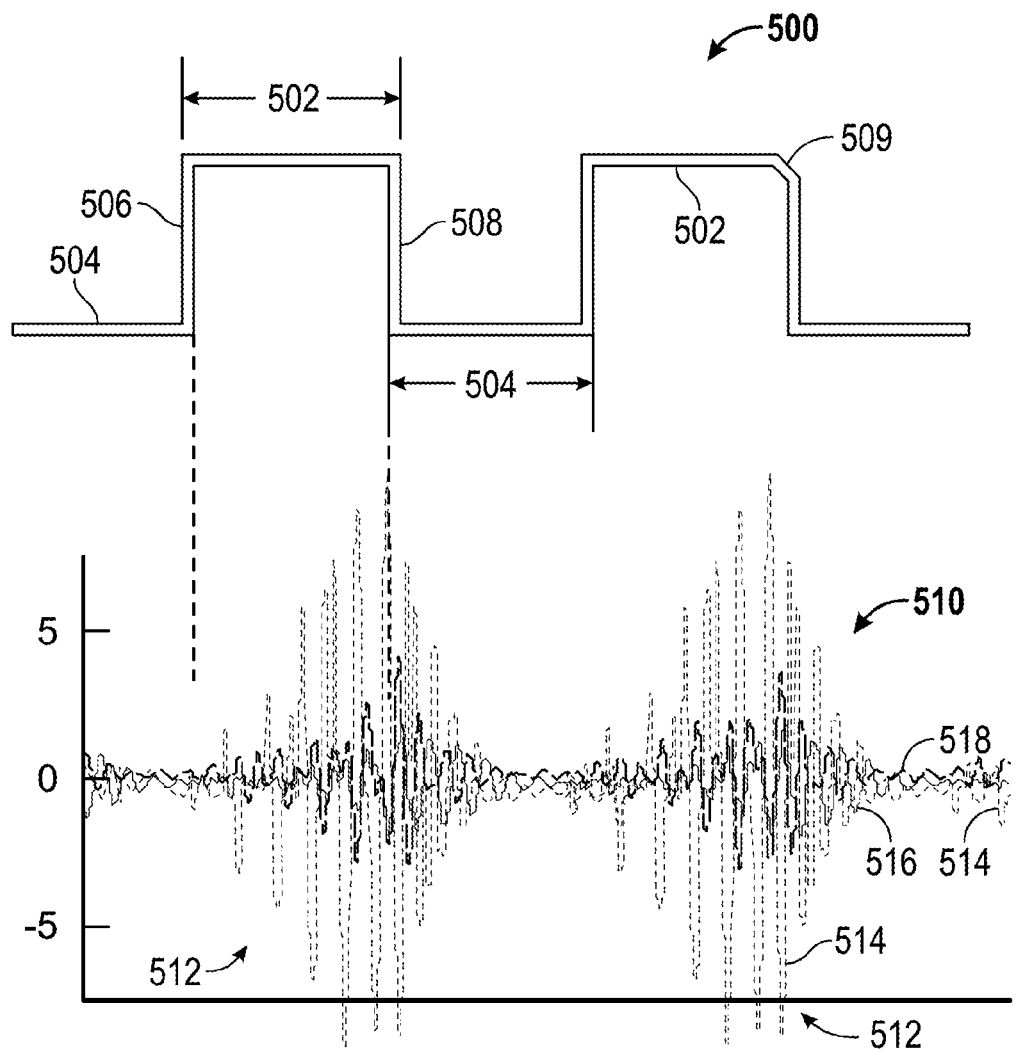
FIG. 6B is a graphical view of an actuation profile and an acceleration profile in accordance with exemplary embodiments.

Referring now to FIG. 6B, examples of an actuation profile 500 and an acceleration profile 510 are illustrated in accordance with some embodiments. The actuation profile 500 represents the commanded actuation signal sent to the motors to determine the intensity and duration of haptic feedback felt by the driver. For example, the actuation profile may represent the average signal generated by the haptic controller 350 to command the actuators 322, 332. The actuation profile 500 includes an active period 502 and an inactive period 504. For example, the active period 502 may be defined by a positive voltage signal generated by the haptic controller 350 and the inactive period 504 may correspond to a low or zero voltage signal generated by the haptic controller 350. Each active period 502 has a leading edge 506 and a trailing edge 508. During the active period 502, the haptic actuator is commanding the selected motors to rotate. During the inactive period 504, the haptic actuator is not commanding the selected motors to rotate. It should be appreciated that the active period 502 is a representation of the average signal applied to the motors, and in fact may include rapidly repeating PWM sequences.

The acceleration profile 510 indicates the acceleration at the surface of the seat bolster. For example, the acceleration profile 510 may be measured with an accelerometer placed at the surface of the first bolster 320 to measure acceleration due to actuation of the actuator 322. The acceleration profile 510 illustrates haptic pulses 512 that are varied in length and spacing to create the haptic feedback felt by the driver of the vehicle. The haptic feedback created by the haptic pulses 512 indicates the type of alert. The acceleration profile 510 includes first direction data 514, second direction data 516, and third direction data 518. In the embodiment illustrated, the first direction data 514 corresponds to acceleration measured normal to the seat bolster surface, the second direction data 516 corresponds to acceleration measured at the surface of the bolster in a fore-aft direction with respect to the motor, and the third direction data 518 corresponds to acceleration measured at the surface of the bolster in a lateral direction perpendicular to the vertical and fore-aft directions In one exemplary embodiment, the peak amplitude of measured vertical acceleration at the activated actuator location normal to the seat bolster surface is at least five times greater than the peak amplitude of the measured acceleration in the vertical, fore-aft, and lateral directions at non-activated actuator locations. Moreover, by way of example, the actuation profile may be adjusted to create a desired acceleration profile felt by variously sized drivers. For example, a high frequency component of the vibration corresponding to the rotational speed of the motor 400 may be within the range of 55 to 67 Hz. The high frequency component is also selected to reduce undesirable interactions with road vibration frequencies. The vertical acceleration of the vibration may be between 50 and 72 m/s$^2$. In one example, the vertical acceleration level is within 10% across each of the actuator locations.

In general, the acceleration profile 510 at the seat bolster increases during the active period 502 of the actuation profile 500 and decreases during the inactive period 504 of the actuation profile 500. The relative duration of the active period 502 and inactive period 504 of the actuation profile 500 may be used to indicate the severity of the potential hazard. Additionally, the time between active periods 502 and inactive periods 504 may be decreased to indicate more urgent alerts. For example, unique haptic alert actuation profiles 500 may be used to distinguish between near-field imminent crash alerts and far-field advisory events that may occur beyond the driver's line of sight.

The motor 600 may be operated in a manner to create haptic pulses at the surface of the seat bolster (e.g., bolster 320, 330) varied in length, spacing, and intensity to create the haptic feedback felt by the driver of the vehicle. The haptic feedback created by the haptic pulses indicates the type of alert, e.g., the nature of the collision condition. The haptic controller 350 determines the appropriate voltage and determines, for example, a pulse width modulation (PWM) pattern of "on" periods where voltage is provided to the motor 600 and "off" periods where no voltage is provided to the motor 600.

In some embodiments, the relative duration of the active period and inactive period may be used to indicate the severity of the potential hazard, and/or the time between active periods and inactive periods may be decreased to indicate more urgent alerts, such as the difference between near-field imminent crash alerts and far-field advisory events that may occur beyond the driver's line of sight. Distinction between urgent and non-urgent alerts may be communicated by varying the haptic feedback to the driver. For example, the number of vibration pulses, pulse on and pulse off cycle patterns, pulse signatures, pulse intensity, or pulse location may be varied to produce various alerts. As an example, when an object is first detected, a single pulse or unique pulse signature may be provided, and as the vehicle moves closer to the object, the separation time between pulses (or pulse signatures) is decreased and/or the number of pules is increased, until a minimum separation time is reached. The intensity settings for the proximity alerts (e.g., more intense as the crash threat is greater) may be distinct from the crash alert settings to reduce customer discomfort or annoyance Examples of exemplary alert patterns are provided below. A haptic alert for a Lane Departure Warning (LDW) event is indicated by three pulses commanded with active periods of 80 ms and inactive periods of 120 ms. A Rear Cross Traffic Alert (RCTA) event is indicated by three pulses commanded with active periods of 100 ms and inactive periods of 100 ms. A Forward Collision Alert (FCA), Crash Imminent Braking (CIB), or Adaptive Cruise Control (ACC) event is indicated by five pulses commanded with active periods of 100 ms and inactive periods of 100 ms. A Rear Park Assist (RPA) first detect event is indicated by one or two pulses commanded with active periods of 70 ms and inactive periods of 130 ms. A RPA and Front Park Assist (FPA) near object event are indicated by five pulses commanded with active periods of 70 ms and inactive periods of 130 ms. An ACC "go notifier" event (to signal to the driver using ACC, after the vehicle has come to a stop, that the vehicle they are following has proceeded to move forward) is indicated by three pulses commanded with active periods of 100 ms and inactive periods of 100 ms.

Figure 7:
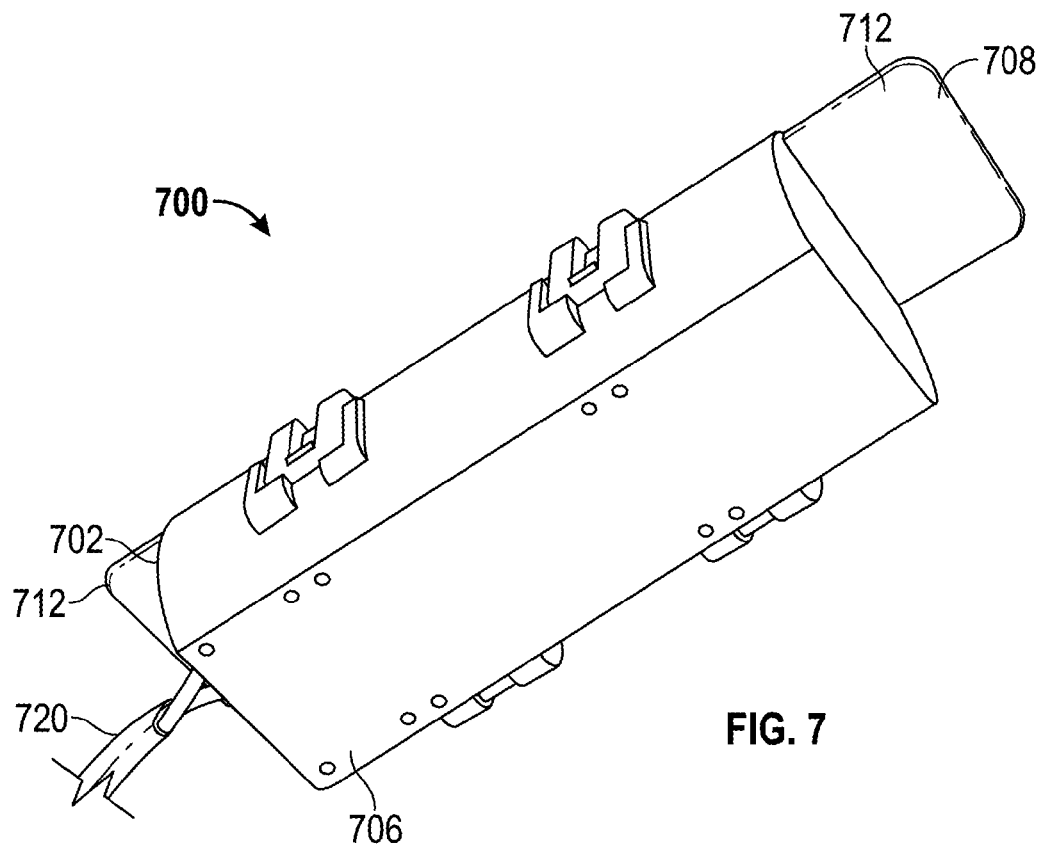
FIG. 7 is an isometric view of an actuator housing incorporated into the seat assembly of FIG. 3 in accordance with an exemplary embodiment.

FIG. 7 is an isometric view of an actuator housing 700 that may be incorporated into the actuators 322, 332 described above, and FIG. 8 is a side view of the actuator housing 700. In general and additionally referring to FIG. 6, the motor 600 may be positioned in the actuator housing 700 for installation and operation, e.g., such that one motor 600 and one housing 700 form each actuator 322, 332 (FIG. 3). In general, the actuator housing 700 is configured to protect the motor 600 while enabling transmission of the haptic signal generated by the motor 600 to the occupant.

The actuator housing 700 may have any suitable size and shape. In one exemplary embodiment, the actuator housing 700 may include side walls 702, a bottom wall 706, and a top wall 708. It should be noted that the terms "side," "top," and "bottom" are merely relative terms to describe the actuator housing 700 as depicted in FIG. 7 and do not necessarily imply or require a particular orientation during installation or operation. The side walls 702 may be configured with first and second portions that separate to provide access to the interior of the actuator housing 700, for example, to install and/or replace the motor 600. Snaps or other locking mechanisms 710 may be provided to secure and release the respective portions. In other embodiments, the actuator housing 700 may have a hinged or clam shell construction to accommodate the motor 600. One or more of the walls 702, 706, 708 may define an aperture for accommodate wiring members 720, which are coupled to the motor 600. As described in greater detail above, the wiring members 720 may be part of the wiring harness 360 that couples the motor 600 to the haptic controller 350 (FIG. 3).

As shown, the top wall 708 may be coupled to or formed by a plate member with at least one extended surface 712. The top wall 708 in FIG. 7 includes extended surfaces 712 on opposite edges of the actuator housing 700. Due to the extended surfaces 712, the top wall 708 may have greater planar dimensions than that of the bottom wall 706. In one exemplary embodiment, the top wall 708 may be approximately 50% larger than the bottom wall 706, although other relative dimensions may be possible. As such, the top wall 708 may be sized to provide advantageous transmission of the haptic response from the motor 600. For example, the larger dimension of the top wall 708 enables transmission of the haptic response over a larger area, e.g., the vibrations may be spread out over a greater area for enhanced detection by the occupant and to increase detectability for a wider range of occupant sizes and occupant positioning in the seat. As also described in greater detail below, the dimensions of the top wall 708 may also facilitate accurate, repeatable installation of the actuators 322, 332 (FIG. 3).

Figure 9:
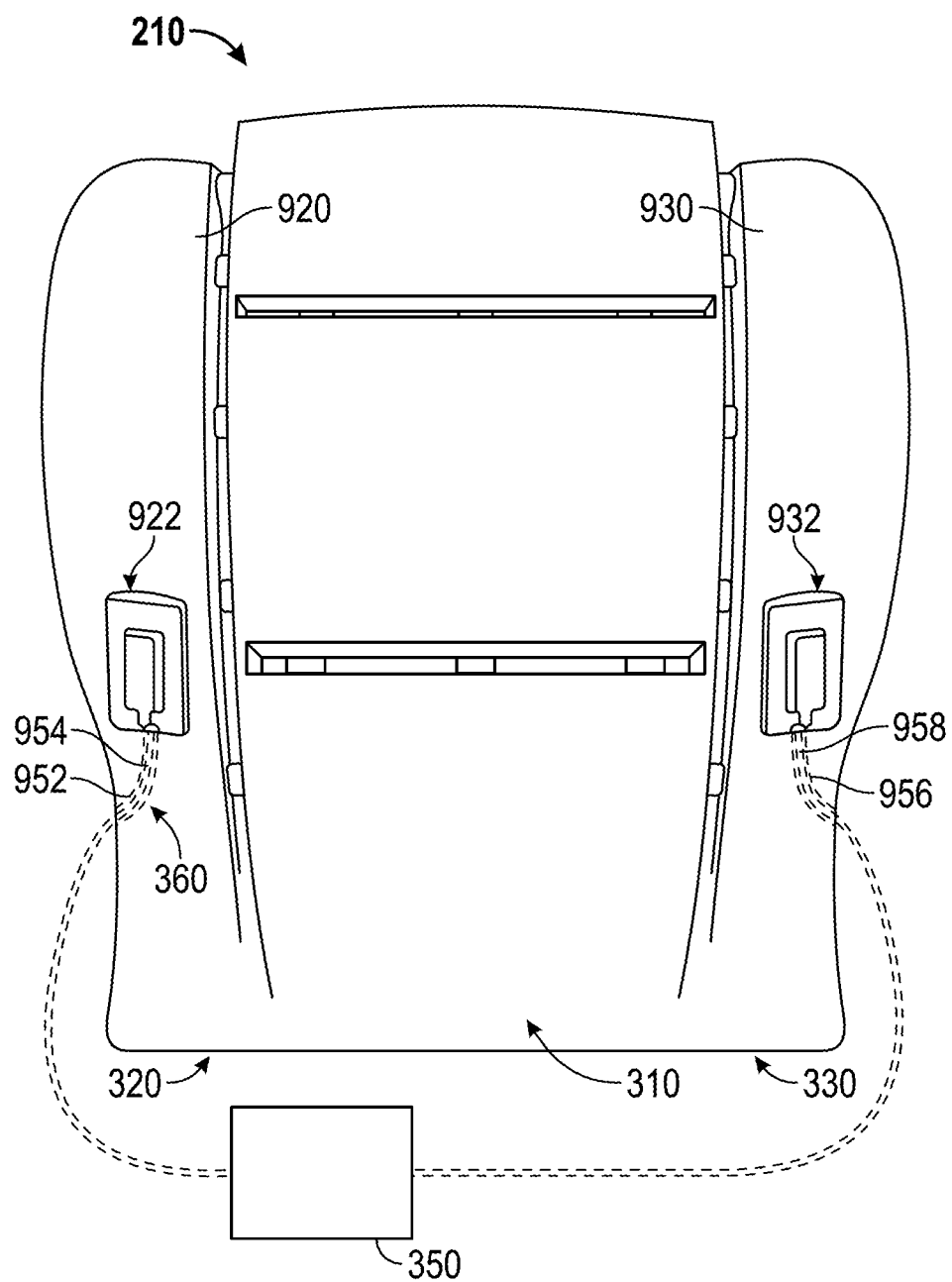
FIG. 9 is a top positional view of the seat assembly of FIG. 3 during installation in accordance with an exemplary embodiment.

FIG. 9 is a top view of the lower seat member 210 removed from the seat back member 220 (FIG. 2) and with a cover removed. As discussed above, the lower seat member 210 may be formed by the seat pan 310 and first and second bolsters 320, 330. As also introduced above, each of the seat pan 310 and first and second bolsters 320, 330 may include a foam body 910, 920, 930 mounted on a frame (not shown in FIG. 9).

FIG. 9 particularly illustrates characteristics that facilitate installation of the actuators 322, 332 (not shown in FIG. 9) into the foam body 920, 930 of the first and second bolsters 320, 330, respectively. In one exemplary embodiment, each foam body 920, 930 defines a depression 922, 932 to accommodate one of the actuators 322, 332.

Figure 8:
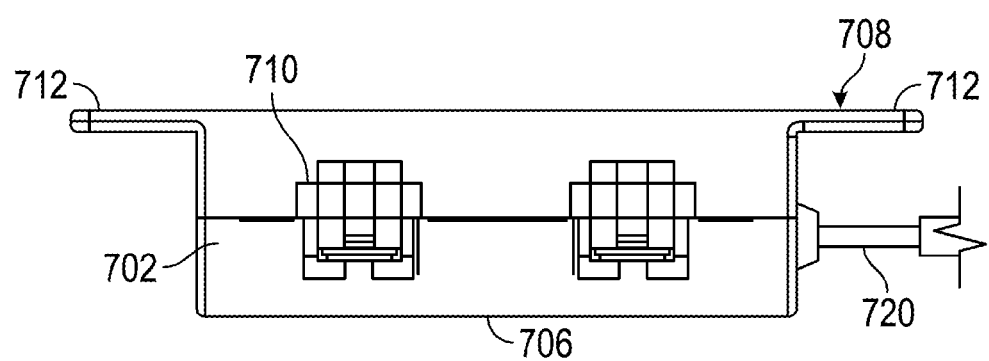
FIG. 8 is a side view of the actuator housing of FIG. 7 in accordance with an exemplary embodiment.
Figure 11:
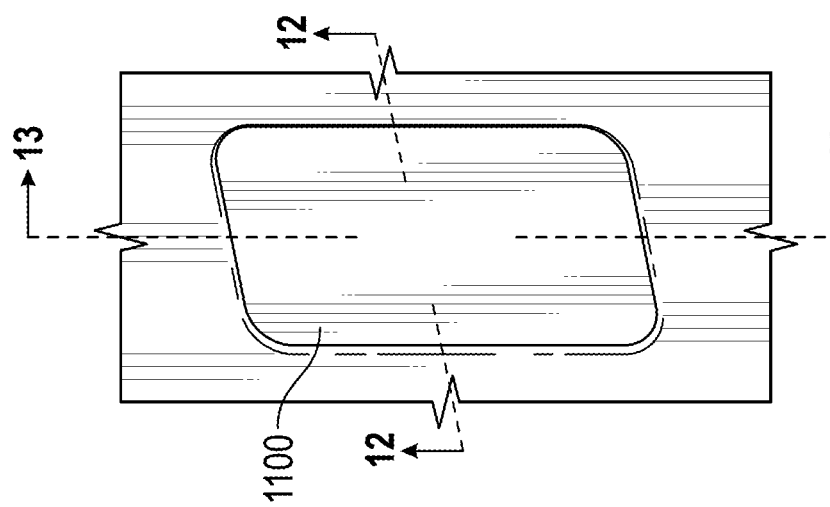
FIG. 11 is another more detailed, partial top positional view of the seat assembly of FIG. 3 during installation in accordance with an exemplary embodiment.
Figure 10:
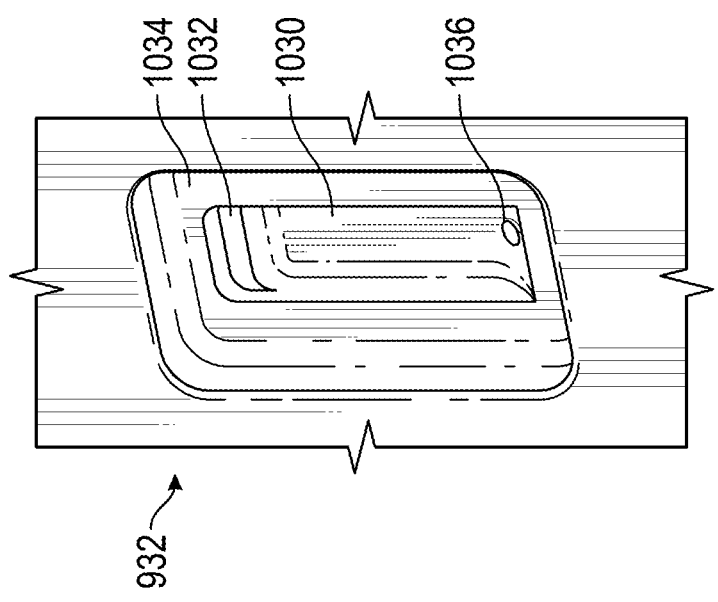
FIG. 10 is a more detailed, partial top positional view of the seat assembly of FIG. 3 during installation in accordance with an exemplary embodiment.
Figure 13:
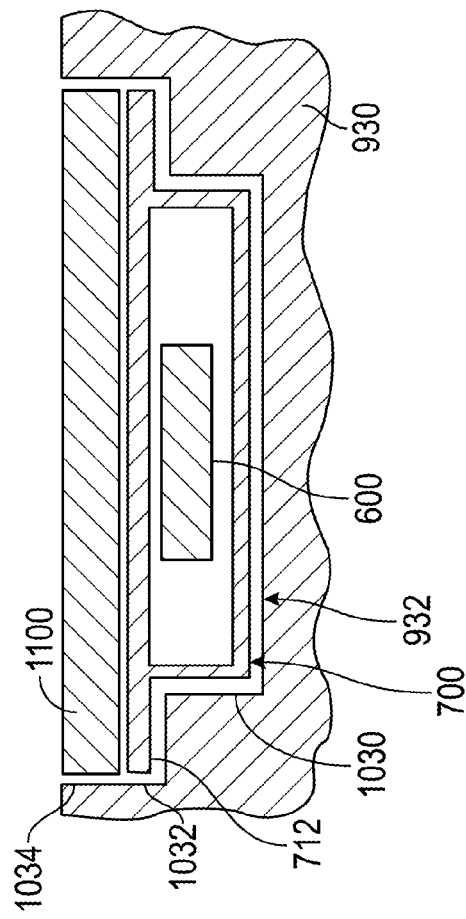
FIG. 13 is a cross-sectional view along line 13-13 of FIG. 11 in accordance with an exemplary embodiment.
Figure 12:
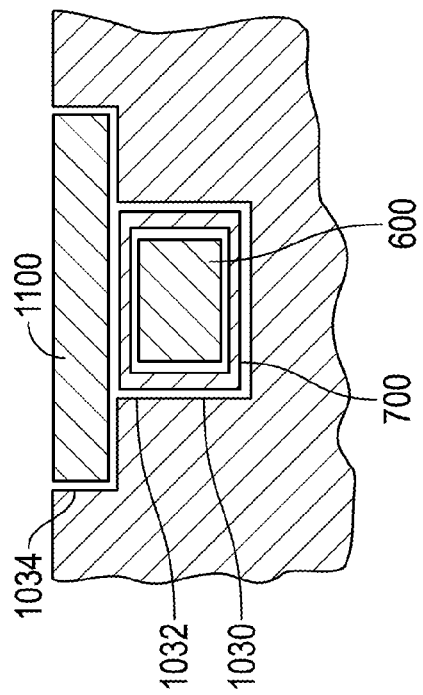
FIG. 12 is a cross-sectional view along line 12-12 of FIG. 11 in accordance with an exemplary embodiment.

FIG. 10 is a more detailed view of depression 932, although the description of FIG. 10 is also applicable to depression 922 (FIG. 9). As shown in FIG. 9, the depression 932 is a multi-layered (or multi-stepped) depression in this exemplary embodiment. In particular, the depression 932 includes a first layer 1030, a second layer 1032, and a third layer 1034. The layers 1030, 1032, 1034 are sized to securely accommodate the actuators 322, 332 (not shown in FIG. 10). Referring additionally to FIGS. 7 and 8, the first layer 1030 is sized with relative dimensions so as to accommodate the side walls 702 and bottom wall 706 of the actuator housing 700. Upon insertion of the side walls 702 and bottom wall 706, the second layer 1032 accommodates the top wall 708 of the actuator housing 700. The walls of the layers 1030, 1032 function to accurately position the actuator housing 700 during installation and to prevent lateral and longitudinal movement of the actuator housing 700 during operation. Additionally referring to FIG. 11, which is a top view of an actuator (e.g., actuator 332) installed in the depression 932, a topper pad 1100 may be provided to cover the actuator housing 700 during installation and operation, as well as to ensure seat comfort and seat durability. The topper pad 1100 may be a mesh or foam pad that fits within the third layer 1034 of the depression 932. Upon installation, the actuator housing 700 and topper pad 1100 may be stacked within the depression 932 to provide a generally uninterrupted planar surface of the respective bolster 320, 330. In other words, the installed actuators 322, 332 are generally placed to not protrude or dent the lower seat member 210. FIGS. 12 and 13 are cross-sectional views along lines 12-12 and 13-13, respectively, of FIG. 11 of an actuator (e.g., actuator 332) installed in a depression (e.g., depression 932) and substantially encompassed by the foam body 930 and topper pad 1100. As a result of this arrangement, the actuators 322, 332 may be installed in the deepest and/or thickest portion of the foam body 920, 930. In other embodiments, the actuators 322, 332 may be closer to the surface or deeper in the foam body 920, 930.

As best shown in FIG. 10, the depression 932 further includes a thru-hole 1036 to accommodate portions of the wiring harness 360, such as the wiring members 720 extending through the actuator housing 700 discussed in reference to FIGS. 7 and 8.

Referring again to FIG. 9, the depressions 922, 932 are depicted on the "top" side (or A-surface) of the lower seat member 210. However, in alternate embodiments, the depressions may be formed on the "bottom" side (or B-surface) on the underside of the lower seat member 210.

Still referring to FIG. 9, the route of the wiring harness 360 is schematically shown. In particular, the wire passages 950 extend through the foam bodies 910, 920, 930 to accommodate the wiring harness 360 such that the motor 600 (FIG. 6) is electrically coupled to the haptic controller 350 (FIG. 3). Typically, the wire passages 950 include a first wire passage 952 to accommodate a first wire 954 of the wiring harness 360 to the first actuator 322 (FIG. 3) and a second wire passage 956 to accommodate another wire 958 of the wiring harness 360 to the second actuator 332 (FIG. 3). In one exemplary embodiment, the wire passages 952, 956 may extend to a common side of the lower seat member 210. In the depiction of FIG. 9, the wire passages 952, 956 and associated wires 954, 958 extend from the respective actuators 322, 332 through the lower seat member 210 and to the haptic controller 350. As shown, the haptic controller 350 may be offset relative to the actuators 322, 332 such that the haptic controller 350 is closer to one actuator 322 than the other actuator 332. In one exemplary embodiment, the haptic controller 350 may be located underneath the lower seat member 210, although other locations may be provided. This arrangement results in the wires 954, 958 being different lengths, e.g., the wire 958 is longer than wire 954. The length difference between the wires 954, 958 functions to prevent wiring errors during installation. Referring to the depicted exemplary embodiment, the wire 954 is the shorter wire, and thus, unable to physically reach the far side actuator 332, which in turn, helps ensure that the wire 954 is properly coupled to the designated controller output for the actuator 322, e.g., the wire 954 for the right side actuator 322 is coupled to the left side output of the haptic controller 350. In some instances, a misrouted wire may not be able to physically reach the haptic controller 350. The controller may additionally have inputs on opposite sides to receive the wires 954, 958. As shown in FIG. 9, one exemplary arrangement may have the left side wire 954 from the left side actuator 322 coupled to the left side of the haptic controller 350 and the right side wire 958 from the right side actuator 332 coupled to the right side of the haptic controller 350. This arrangement additionally may prevent wiring errors.

The embodiments described herein provide numerous advantages over prior alert devices. For example, by placing haptic motors within the resilient foam cushion of the seat, direct contact between the seat frame and the motors may be eliminated. Accordingly, transmission of vibrations through the seat and between motor locations may be reduced. In addition, the motors may be placed under the legs of an occupant to improve directional feedback (e.g., to the left or right of the driver). The resilient foam seat bottom further dampens or attenuates vibration transmission between motor locations. Furthermore, the intensity of haptic pulses at a first motor may be based on the vibration damping between the first motor and a second motor location to achieve a desired pulse intensity at the first motor with no, or only minor, vibration crossover to the second motor location.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A haptic feedback system, comprising:
 a bottom seat member comprising a seat pan with a first side and a second side, a first bolster positioned on the first side of the seat pan, and a second bolster positioned on the second side of the seat pan, wherein the first bolster and the second bolster include a resilient material;
a first motor supported by the resilient material of the first bolster;
a second motor supported by the resilient material of the second bolster,
wherein the first bolster defines a first depression in a first upper surface and the second bolster defines a second depression in a second upper surface, and wherein the first motor is disposed within the first depression and the second motor is disposed within the second depression; and
a seat frame, wherein the resilient material of the first bolster is disposed between the first motor and the seat frame to attenuate vibrations between the first motor and the seat frame, and wherein the resilient material of the second bolster is disposed between the second motor and the seat frame to attenuate vibrations between the second motor and the seat frame; and
a controller in communication with the first motor and that generates a pulse width modulation (PWM) signal to command the first motor and the second motor,
wherein the controller generates the PWM signal that commands the first motor to generate haptic pulses so that a first peak vertical acceleration at the first upper surface of the first bolster in a vertical direction is at least five times greater than a second peak acceleration in a fore-aft direction and a third peak acceleration in a lateral direction.

2. The haptic feedback system of claim 1 wherein the resilient material of the first bolster substantially encompasses the first motor to attenuate the vibrations between the first motor and the seat frame, and wherein the resilient material of the second bolster substantially encompasses the second motor to attenuate the vibrations between the second motor and the seat frame.

3. The haptic feedback system of claim 1 wherein the controller generates the PWM signal to command the first motor based on a vibrational coupling between the first motor and the second bolster and to command the second motor based on a vibrational coupling between the second motor and the first bolster.

4. The haptic feedback system of claim 3 wherein the first motor include a first axis of rotation, and wherein the controller generates the PWM signal to command the first motor to generate haptic pulses with the peak vertical acceleration normal to the first bolster that is at least seven times greater than the second and third peak accelerations.

5. The haptic feedback system of claim 3 wherein the PWM signal that commands the first motor is a first PWM signal, and wherein the controller generates a second PWM signal to command the second motor to generate haptic pulses with a fourth peak vertical acceleration that is within about 10% of the first peak vertical acceleration of the haptic pulses generated by the first motor.

6. A vehicle seat assembly, comprising:
a seat frame;
a bottom seat member secured to the seat frame, the bottom seat member comprising a seat pan with a first side and a second side, a first bolster positioned on the first side of the seat pan, and a second bolster positioned on the second side of the seat pan, wherein the first bolster and the second bolster include a resilient material, wherein the first bolster defines a first depression in a first upper surface and the second bolster defines a second depression in a second upper surface;
a first motor disposed in the first depression and separated from the seat frame by the resilient material of the first bolster to attenuate vibrations between the first motor and the seat frame;
a second motor disposed in the second depression and separated from the seat frame by the resilient material of the second bolster to attenuate vibrations between the second motor and the seat frame,
wherein the resilient material of the first bolster substantially encompasses the first motor, and wherein the resilient material of the second bolster substantially encompasses the second motor; and
a controller in communication with the first motor and that generates a pulse width modulation (PWM) signal to command the first motor and the second motor,
wherein the controller generates the PWM signal that commands the first motor to generate haptic pulses so that a first peak vertical acceleration at the first upper surface of the first bolster in a vertical direction is at least five times greater than a second peak acceleration in a fore-aft direction and a third peak acceleration in a lateral direction.

7. The vehicle seat assembly of claim 6 wherein the controller generates the PWM signal to command the first motor based on a vibrational coupling between the first motor and the second bolster.

8. The vehicle seat assembly of claim 7 wherein the first motor include a first axis of rotation, and wherein the controller generates the PWM signal to command the first motor to generate haptic pulses with the first peak vertical acceleration normal to the first bolster that is at least seven times greater than the second and third peak accelerations.

9. The vehicle seat assembly of claim 7 wherein the PWM signal that commands the first motor is a first PWM signal, and wherein the controller generates a second PWM signal to command the second motor to generate haptic pulses with fourth peak vertical acceleration that is within about 10% of the first peak vertical acceleration of the haptic pulses generated by the first motor.

10. A vehicle, comprising:
a seat frame;
a bottom seat member secured to the seat frame, the bottom seat member comprising a seat pan with a first side and a second side, a first bolster positioned on the first side of the seat pan, and a second bolster positioned on the second side of the seat pan, wherein the first bolster and the second bolster include a resilient material, wherein the first bolster defines a first depression in a first upper surface and the second bolster defines a second depression in a second upper surface;
a first motor disposed in the first depression and separated from the seat frame by the resilient material of the first bolster to attenuate vibrations between the first motor and the seat frame;
a second motor disposed in the second depression and separated from the seat frame by the resilient material of the second bolster to attenuate vibrations between the second motor and the seat frame; and
a controller in communication with the first motor and the second motor and that generates a first pulse width modulation (PWM) signal to command the first motor based on a vibrational coupling between the first motor and the second bolster and that generates a second PWM signal to command the second motor based on a vibrational coupling between the second motor and the first bolster, wherein the controller generates the first PWM signal that commands the first motor to generate haptic pulses so that a first peak vertical acceleration at the first upper surface of the first bolster in a vertical direction is at least five times greater than a second peak acceleration in a fore-aft direction and a third peak acceleration in a lateral direction.

11. The vehicle of claim 10 wherein the first motor include a first axis of rotation, and wherein the controller generates the first PWM signal to command the first motor to generate haptic pulses with the first peak vertical acceleration normal to the first bolster that is at least seven times greater than the second and third peak accelerations.

12. The vehicle of claim 10 wherein the controller generates the second PWM signal to command the second motor to generate haptic pulses with a fourth peak vertical acceleration that is within about 10% of the first peak vertical acceleration of haptic pulses generated by the first motor with the first PWM signal, and wherein the first PWM signal and the second PWM signal include substantially a same PWM pattern.

13. The haptic feedback system of claim 1 wherein the controller is configured to selectively and individually command the first motor and the second motor.

\* \* \* \* \*